United States Patent Office 3,097,961
Patented July 16, 1963

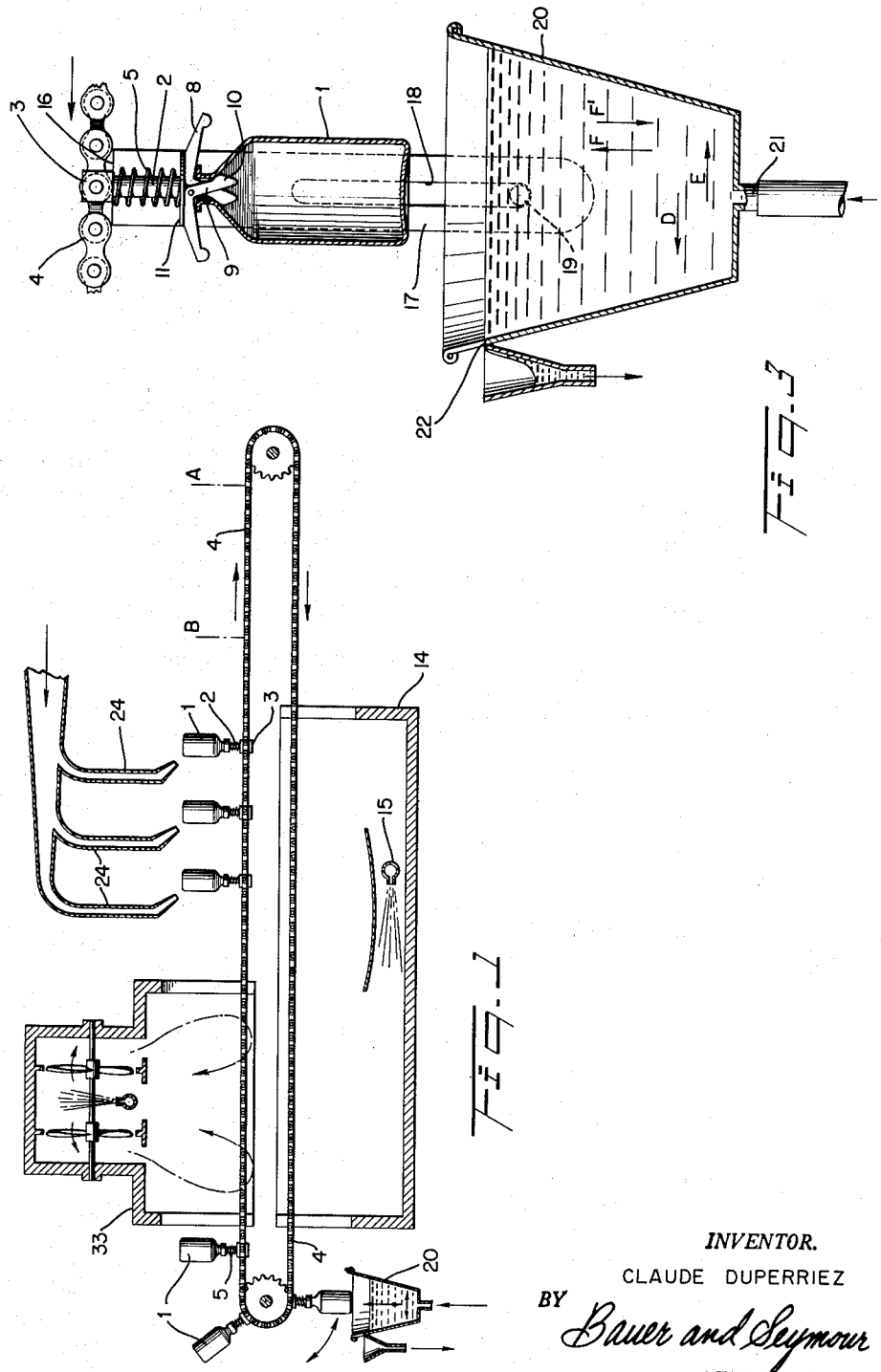

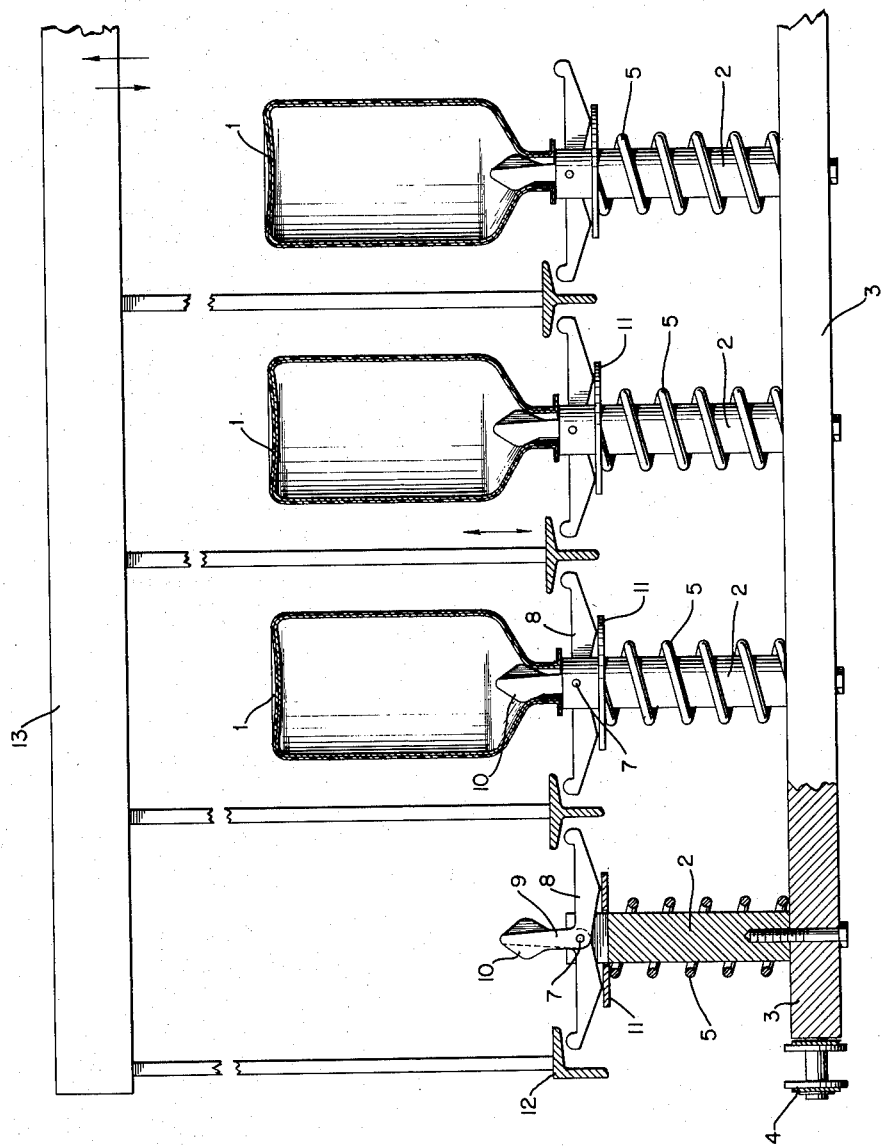

3,097,961
PLASTIC COATING OF GLASS OBJECTS
Claude Duperriez, Sucy-en-Brie, France, assignor to Cie de Saint-Gobain, Paris, France
Filed Sept. 28, 1959, Ser. No. 844,603
Claims priority, application France Sept. 26, 1958
3 Claims. (Cl. 117—54)

This invention relates to the plastic coating of glass objects and particularly to the coating of glass bottles with protective plastic coatings. This process is applicable to objects other than glass, for instance those which have a silicious make-up, such as stone and fused quartz.

It has already been proposed to coat flasks and bottles of glass with a layer of plastic material, usually composed of polyvinyl chloride. This layer protects the flask against shock while protecting the user of bottles containing liquids or gases under pressure. If the glass breaks, the fragments are held by an envelope of plastic material and are inoffensive. In these known processes the flasks or bottles are placed on a conveyor and are subjected to preheating to a temperature which is generally on the order of 80 to 100° C. The flasks after having been heated are plunged into a bath of liquid plastic for a time which corresponds to a diminution of the calories, which were accumulated by the object during the preheating, to a point such that little further coagulation can occur. During the immersion of the object the heat of the object causes the coagulation, on the surface of the bottle, of a layer of plastic. This coagulation stops as soon as the number of calories in the flask has been consumed. After the immersion, the flasks are withdrawn and drained of adhering uncoagulated plastic, which is found on the surface in drops; in some processes the coated flasks are submitted to heating in a furnace having a temperature on the order of 180 to 200° C. for a relatively long period of time, for instance 10 minutes, and are then cooled. The immersion of the flask in the liquid bath is made in an inclined position in order to permit the escape of the bubble of air which forms under the bottom. During immersion the flask is moved laterally in the bath, which must therefore be of substantial dimensions to permit the movement.

These known processes present a certain number of imperfections, some of which will be mentioned as the description of the present invention proceeds.

It is an object of this invention to establish a system of coating glass and the like with plastic of selected thickness in which the end point is not based on the reduction of heat to a non-effective level. It is an object of the invention to coat glass and the like with plastic, and to establish the thickness of the plastic layer as a function of the duration of immersion.

Another object of the invention is to correlate the preheating with the hardening of the coagulated resin so that the process is operable continuously to produce layers of pre-selected thickness.

Another object of the invention is to operate the process at higher temperature and higher speed.

Another object of the invention is to construct a novel apparatus capable of carrying out the process set forth herein, but as the apparatus is a separate invention it will not be completely described herein but will be indicated diagrammatically and without detail.

Whereas in the prior art preheating was carried out at 80 to 100° C., in the present case it is carried out at 130 to 180° C. Similarly, in the prior art the hardening of the plastic was carried out at 180 to 200° C., but the present process hardens the plastic by gas at temperatures on the order of 350 to 400° C. In this invention the glass object is given a prolonged exposure to a preheating furnace of relatively high temperature, which gives it a substantial reserve of heat. This reserve of heat is superior to that which is necessary to secure the coagulation of plastic material to the selected thickness. Thus, if a plastic coating ½ millimeter in thickness is to be applied, the amount of heat required to form such a coating can be computed, and in the present case the heat reserve imparted to the object will be substantially in excess of this required amount. This produces a change in the nature of the process, which previously was related to the reaching of an equilibrium between the thickness of the plastic layer and the diminution of the heat in the object. In the present case the thickness of the layer is related solely to the duration of immersion, being thus a matter of time. This has the following advantages: It reduces the time of treatment, the degree of thickness deposited being due to the limitation of the time of immersion and not, as in the prior processes, to the diminution of the reserve of heat in the glass; it accomplishes, at the outlet of the bath, a coagulation of the exterior layer which is still fluid, which makes it unnecessary to remove adherent drops or to employ the electrostatic coagulation by infra-red rays which was employed in some processes; and it eliminates the influence of glass thickness on the thickness of the plastic layer. In effect, the heat reserve of the glass varies with its thickness. It follows that, in processes having a low grade thermal cycle, which act by the diminution of the heat in the object immersed in the bath, the thickness of the layer varies with the thickness of the glass.

According to the invention the quantity of heat imparted to the glass is much greater than that which is needed to form a layer of the thickness desired; due to this excess of heat the thickness deposited will depend on the time of immersion. This produces a uniform layer on objects of varying thickness, a layer of plastic which is much more uniform in thickness than could be applied to the same article by prior processes. In particular, the angles are better coated and it has been demonstrated that the reduction in thickness at the angles of a bottle is about 25 percent, which compares most favorably with the 50 to 60 percent which was customary in the prior art.

The new process permits rapid hardening of the plastic layer because the glass is still hot. Before immersion the glass is preheated so that the plastic will form on it a coating of the chosen thickness, and so that, after the selected coat has formed and the object has been withdrawn from the bath, there will still be in the object a temperature, an excess of calories, sufficient to coagulate the external surface of the coating. I have discovered that the plastic thus coagulated can sustain a strong thermal shock if it is of short duration. Thus one may reduce the time of final heating (hardening) by raising the temperature of the gases employed. Thus in this invention, using the relatively high temperatures, the hardening may require one minute and 50 seconds and temperatures of 380 to 400° C., instead of the 10 minutes required at the 200° utilized in the prior art.

The plastic used as the raw material may be of any kind which is heat hardening, but polyvinyl chloride with a substantial content of any usual plasticizer, a small amount of stabilizer, and, not necessarily, coloring matter is preferred. Satisfactory plasticizers include dioctyl adipate, dioctyl phthalate, and dibutyl phthalate, chlorinated carbides. Satisfactory stabilizers include tin salts, barium cadmium salts, lead stearate, and alkyl tin sulfides. These listings are exemplary. Satisfactory colors are heat-resistant pigments.

In addition to reducing the time required for coagulation and hardening, the new invention produces a more uniform and more limpid coating. The rapidity of the final heat treatment permits the furnace man to make rapid corrections during the operation of the process, that is to say that an inefficient procedure, which produces an imperfect coating, can be re-established on satisfactory standards before many imperfect articles have been made. This was not possible with prior processes.

The articles are preferably heated all the way through and reach substantial equilibrium of temperature during the preheating, and this aids in producing a good distribution of the plastic layer deposited. Finally, by establishing in the preheating furnace a convenient temperature gradient one may regulate the thickness of the coat deposited from the top to the bottom of the object, for example in the case of a flask it is necessary that the neck shall be hotter than the bottom to compensate for the difference in time of immersion. The gradient of temperature can be achieved by controlling the turbulence of the furnace. This turbulence is very low which tends to set up a high temperature at the top and a relatively low temperature at the bottom of the furnace. The less the turbulence the higher the difference of temperature.

The process also distinguishes from those of the prior art in that the immersion of the object in the bath is carried out with a minimum displacement of the object laterally. The introduction of the object in the bath takes place vertically and, in the case of a flask, in a position inclined at the moment of introduction, in order to prevent the formation of a bubble of air in the concavity. The flask is then made vertical in the bath, preferably as closely as possible to the center of gravity of the immersed object. The upright position of the flask is necessary in order that the ring at the top shall be parallel to the surface of the bath at the end of the immersion. The flask is withdrawn vertically from the bath.

The advantage of a minimum displacement of the flask with respect to the bath is to assure a distribution as uniform as possible of the plastic material on all the surfaces of the flask. In the prior art procedures the lateral movement of the flask through the bath created unsymmetrical and unequal distribution of the plastic layer on the flask. Furthermore the immersion which is carried out by this process makes unnecessary the rotation of the flask in the bath which was used by a certain known process to improve the uniformity of the plastic layer. Thus there is produced a simplification of the apparatus and a greater precision in the coverage of the neck of the bottle.

The process of this invention reduces the amount of plastic required in the immersion bath because it permits the use of a container of smaller size than was required by the prior art. As a result, only a small quantity of plastic material is lost at the end of fabrication.

The vertical removal of the flask from the bath leaves a residual drop at the center of the bottom where it does not interfere with the stability of the flask when it stands. It is not necessary to remove that drop. In conformity with the invention the bath of plastic material can be electrically insulated and charged with high voltage potential. One can thus assure a better fluidity of the plastic material along the sides of the flask so that the thickness of the fluid film will be reduced, which improves its coagulation.

It has been demonstrated that the speed of withdrawing a flask vertically varies according to the relation $$V = K \sin^2 \alpha$$

where V is the speed of withdrawal, K is a constant representing the viscosity of the plastic material and $\alpha$ is the angle made by a tangent to the profile of the flask with respect to the horizontal.

It is advantageous to give to the flask at the end of its immersion a vertical oscillating movement of small amplitude, for example 2 to 4 millimeters, which assures an increase in the thickness of the layer of plastic in the neighborhood of the ring on the neck to which the sealing member is to be attached.

In the drawings, wherein like reference characters refer to like parts throughout the several views, FIG. 1 is a schematic view of an apparatus adapted to carry out the process of the invention;

FIG. 2 is a detailed view of the apparatus which supports the flasks on the endless chains of the conveyor;

FIG. 3 is a schematic view of the apparatus for immersing the flasks.

As shown in FIGS. 1 and 2, flasks 1 are supported by posts 2 which are fixed on rods 3 of square section articulated at each extremity on endless chains 4. The rods 3 are immobilized on the chains in a position such that the posts 2 are perpendicular to the plane of the chains. The apparatus to accomplish this is not shown. The apparatus used to hold the flasks is shown in FIG. 2. At the end of post 2 are disposed for opposite operation two levers each having two arms pivoted on axis 7. One of the arms 8 of the levers is horizontal. The other 9 is vertical and has a projection 10. A ring 11 is mounted about the post 2 and is thrust by the spring 5 against the arms 8 of the lever so as to bias the lever arms 9 from each other and to move the enlargements 10 toward their widest position. It is sufficient, to mount the flask, to press the neck of the flask over the enlargements 10 with sufficient strength to overcome the spring and make the enlarged branches 10 overlap. These branches move back to wide position and retain the flask. The flask is freed by means of angle irons 12 supported by a vertically movable bar 13. In the low position of the bar 13 the angle irons 12 apply to the arms 8 of the levers sufficient force to overcome the springs and overlap the blades 10.

The mechanism for advancing the chains is not shown but it advances intermittently so that each flask advances from stage to stage of the process by steps. The flasks which are put in place in location A, as shown in FIG. 1, are carried into the preheating furnace 14 which is heated, for example, by burner 15. The flasks arrive, after issuing from the preheating furnace, above the container of plastic 20 where they are stopped in one of the steps of the chain. In this position the square bar 3 which carries the post 2 supporting the flask is released and may turn. It is immobilized in this new position by the fact that it reposes on the upper surface 16 of a plate 17 which has an opening 18 with which is engaged a shaft 19 which is fixed in the walls of container 20. This container is provided with an inlet port 21 by which the plastic liquid is admitted and with an overflow 22 by which it can be returned to the source. A system of cams, which is not shown, gives the container small transverse displacement in the direction of the arrow D, which inclines the flask by the intervention of shaft 19 and the lever 17, which, in turning, makes the square bar oscillate. The container then moves in the direction of the arrow F. The bath arrives in contact with the flask and begins to cover it. The flask being inclined, no bubble forms on the bottom. The container continues to rise and is then displaced in the direction of the arrow E until the flask is vertical again. At the end of the immersion a slight vertical motion of small amplitude is imparted in order to carry the liquid as high as possible on the flask. Thereafter the container is lowered in the direction indicated by arrow $F^1$ and resumes its initial position.

The movements which have been described are imparted by a cam of suitable profile but as that relates to apparatus inventions, it is not described herein.

It is desirable that the speed of withdrawal should be proportional to the square of the sine of the angle that the profile makes with the horizontal. The profile of the cam is shaped accordingly. For a flask in which the body is approximately cylindrical one can employ a constant speed of withdrawal, that is to say, in the region corresponding to the profile of the cam the withdrawal would be constant.

It is advantageous, as above stated, that the container shall be insulated from surrounding objects and submitted to high electrostatic voltage.

The flasks which are thus made are carried by the chains 4 into the hardening furnace diagrammatically shown at 33 in FIG. 1. They are then submitted to cooling by air issuing from blowers 24. When the flasks reach position B they are liberated by angle irons which operate on the levers so that the cool flasks can be removed.

As an example, good results are obtained with a plastic bath of the following composition:

| | Percent |
|---|---|
| Polyvinyl chloride | 60 |
| Dioctyl adipate | 37 |
| Tin salts | 2 |
| Colored pigments | 1 |

The flasks are preheated to 140 to 150° C. in a furnace at a temperature of 170 to 200° C. and maintained in the furnace between 5 to 10 minutes according to the desired thickness of the coating and to the sizes of the flasks. Practically, the temperature of the flasks is determined experimentally, this temperature being only limited by the resistance of the glass to thermal shock.

On metallic flasks this temperature was raised to 250° C., which permits the application of very thick coatings.

It is to be noted that in the cited composition 7% of dioctyl adipate may be replaced by 7% of tricresylphosphate.

The temperature limits of the bath are given by the quality of the plastic; practically, the temperature must be slightly below the temperature of maximum fluidity, say 5 to 10% below. If the temperature is too low the bath thickens and a too great quantity of plastic is carried away, producing drops on the surface, or the speed of removal of the bottles must be reduced so that the time of immersion is accordingly increased. On the other hand, a bath too hot leads to the damaging of the plastic.

The time of immersion in the bath is variable from 8 to 20 seconds according to the desired thicknesses; practically, it varies from 10 to 12 seconds. This time comprises the introduction in the bath, the stay in the bath and the removal from the bath of the object.

Although only a limited number of embodiments of the invention have been illustrated in the accompanying drawings and described in the foregoing specification, it is to be expressly understood that various changes, such as in the relative dimensions in the parts, material used, and the like as well as the suggested manner of use of the apparatus of the invention, may be made therein without departing from the spirit and scope of the invention as will now be apparent to those skilled in the art.

What is claimed is:

1. A process of coating a glass object with a layer of vinyl plastisol which comprises preparing a bath of vinyl plastisol, heating the object at about 130–180° C., immersing the object in the bath, withdrawing it from the bath before its heat reserve has been exhausted and while its temperature is still above the setting temperature of the resin and while this temperature is at least sufficient to set the outer surface of the layer deposited on its external surface, heating the resinous layer at a hardening temperature from about 350 to about 400° C., ending the heating before deterioration of the coating, and cooling the object to room temperature.

2. A method according to claim 1 in which the object is of differential thickness and is heated hotter in the thinner parts to attain an equal thickness of coating over the surface of the object.

3. A method according to claim 1 in which the treated object is a flask, immersion is from the bottom toward the top and the upper portions are more highly heated than the bottom portions whereby to compensate for the difference in time of immersion.

References Cited in the file of this patent

UNITED STATES PATENTS

| 1,770,620 | Mann | July 15, 1930 |
|---|---|---|
| 2,550,232 | Donnell et al. | Apr. 24, 1951 |
| 2,661,307 | Foster | Dec. 1, 1953 |
| 2,683,263 | Lenhart | July 13, 1954 |
| 2,868,670 | Van Laar | Jan. 13, 1959 |
| 2,898,279 | Metcalfe et al. | Aug. 4, 1959 |
| 2,964,798 | Ferrell | Dec. 20, 1960 |
| 2,981,639 | Kachele | Apr. 25, 1961 |
| 3,028,260 | McKee | Apr. 3, 1962 |

FOREIGN PATENTS

| 591,611 | Great Britain | Aug. 22, 1947 |
|---|---|---|
| 555,385 | Canada | Apr. 1, 1958 |

OTHER REFERENCES

Chem-o-Sol, Chemical Products Corp., King Philip Road, East Providence, R.I., mailed Aug. 8, 1958, page 4.

British Plastics, pages 169–170, April 1948.

Modern Plastics, vol. 29, No. 4, page 93, December 1951.

Rubber Age, vol. 67, No. 5, page 558, August 1950.